United States Patent
Stephan et al.

(10) Patent No.: US 6,205,965 B1
(45) Date of Patent: Mar. 27, 2001

(54) DEVICE FOR ADJUSTING THE RELATIVE ROTATIONAL BACKGROUND OF CAMSHAFTS

(75) Inventors: Wolfgang Stephan, Zizishausen; Alfred Trzmiel, Grafenberg, both of (DE)

(73) Assignee: h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/296,490

(22) Filed: Apr. 22, 1999

(30) Foreign Application Priority Data

May 8, 1998 (DE) .............................................. 198 20 534

(51) Int. Cl.[7] ........................................................ F01L 1/34
(52) U.S. Cl. .................................. 123/90.15; 123/90.17; 123/90.31; 474/110; 474/111
(58) Field of Search ........................... 123/90.15, 90.17, 123/90.31; 474/110, 111

(56) References Cited

U.S. PATENT DOCUMENTS

| 4,828,536 | * | 5/1989 | Ampferer | 474/110 |
|---|---|---|---|---|
| 5,109,813 | * | 5/1992 | Trzmiel et al. | 123/90.15 |
| 5,117,786 | * | 6/1992 | Trzmiel et al. | 123/90.31 |
| 5,120,278 | * | 6/1992 | Trzmiel et al. | 474/110 |
| 5,197,420 | * | 3/1993 | Arnold et al. | 123/90.15 |
| 5,323,739 | * | 6/1994 | Möllers | 123/90.15 |
| 5,366,415 |   | 11/1994 | Church et al. . |   |
| 5,542,383 |   | 8/1996 | Clarke et al. . |   |
| 5,597,367 | * | 1/1997 | Trzmiel et al. | 474/110 |
| 5,606,941 | * | 3/1997 | Trzmiel et al. | 123/90.15 |

FOREIGN PATENT DOCUMENTS

| 0445356B1 | 9/1991 | (DE) . |
| 4041785A1 | 6/1992 | (DE) . |
| 19541769A1 | 5/1997 | (DE) . |
| 19541769A1 | 6/1997 | (DE) . |

OTHER PUBLICATIONS

ATZ Automobiltechnische Zeitschrift 93 (1991), Heft 10 and MTZ Motortechnische Zeitschrift 52 (1991) Heft 12.
German Patent Office Action, Mar. 29, 1999.
European Search Report, Sep. 24, 1999.

* cited by examiner

Primary Examiner—Thomas Denion
Assistant Examiner—Tu M. Nguyen
(74) Attorney, Agent, or Firm—Evenson, McKeown, Edwards & Lenahan, P.L.L.C.

(57) ABSTRACT

A combustion engine valve control camshaft adjusting mechanism includes hydraulically actuated piston members to control the relative rotational position of a pair of camshafts. A locking detent is biased by a spring toward a locking position preventing the adjusting movement of the piston members. Hydraulic pressure is supplied to the detent in a direction opposite the spring to release the locking detent and permit the adjusting mechanism to operate after a predetermined engine warmup phase of up to a few seconds.

17 Claims, 2 Drawing Sheets

DEVICE FOR ADJUSTING THE RELATIVE ROTATIONAL BACKGROUND OF CAMSHAFTS

BACKGROUND AND SUMMARY OF THE INVENTION

This application claims the priority of German application 198 20 534.1, filed May 8, 1998, the disclosure of which is expressly incorporated by reference herein.

The invention relates to a device for adjusting the relative rotational position of camshafts that are rotatably supported and operable for actuating valves in an internal combustion engine.

European Patent Document EP 0 445 356 B1 relates to a device for adjusting the relative rotational positions of two camshafts located in a cylinder head of an internal combustion engine. The adjustment processes produce a change in the valve control times. This device has proven itself in practice, especially because, in addition to the teleological influence on the control times of the internal combustion engine, it is easy to integrate into a secondary chain drive and its components are simple and function well. (See reprint from ATZ Automobiltechnische Zeitschrift 93 (1991), Volume 10 and MTZ Motortechnische Zeitschrift (52) 1991, No. 12.

A comparable device is found in German Patent Document DE 40 41 785 A1 which can likewise be used in a chain drive between two camshafts.

Both devices comprise pistons inserted into one another and operating hydraulically, with zero pressure when the engine is at rest. When the engine is started, therefore, as a result of the load imposed by one piston through the tight side of the chain, an adjusting force is exerted on the adjusting mechanism, against the advance or retard stop, that produces metallic noises in the device.

A goal of the invention therefore is to make provisions in devices of the above general type that prevent an undesired adjusting process when the engine starts.

This goal is achieved according to the invention by providing an arrangement, wherein said device cooperates with a locking device that secures the positioning mechanism of the hydraulic piston of the device before starting or up to a point shortly after the starting of the engine.

Additional features that characterize preferred embodiments of the invention are described below and in the claims that follow.

Primary advantages achieved with the preferred embodiments of the invention arise from the fact that the locking device acts on the adjusting mechanism of the device during starting, especially during a cold start, of the engine, in such fashion that adjustment of the device is prevented. As a result, assurance is provided that the device remains in a specified basic position for up to 3 seconds following the starting process or the starting of the engine. As a result, undesirable noises produced at the stops by the outer hydraulic piston are prevented when the system, still at zero pressure, attempts to move this outer hydraulic piston from a first end position into a second end position by means of the tight side of the chain. As soon as the hydraulic pressure has built up, the locking piston of the locking device is unlocked and the adjusting mechanism and/or outer hydraulic piston operates in accordance with the specified switching points, in other words as a function of the engine parameters rpm and load which is equivalent to accelerator position.

The arrangement and design of the locking piston is simple, which not only ensures proper functioning of the locking device but also means that the parts can be easily manufactured. In addition, the reliable cooperation of the locking piston with the spring element and the hydraulic medium should be emphasized, as well as the compact design.

Other objects, advantages and novel features of the present invention will become apparent from the following detailed description of the invention when considered in conjunction with the accompanying drawings.

DETAILED DESCRIPTION OF THE DRAWINGS

Figure 1:
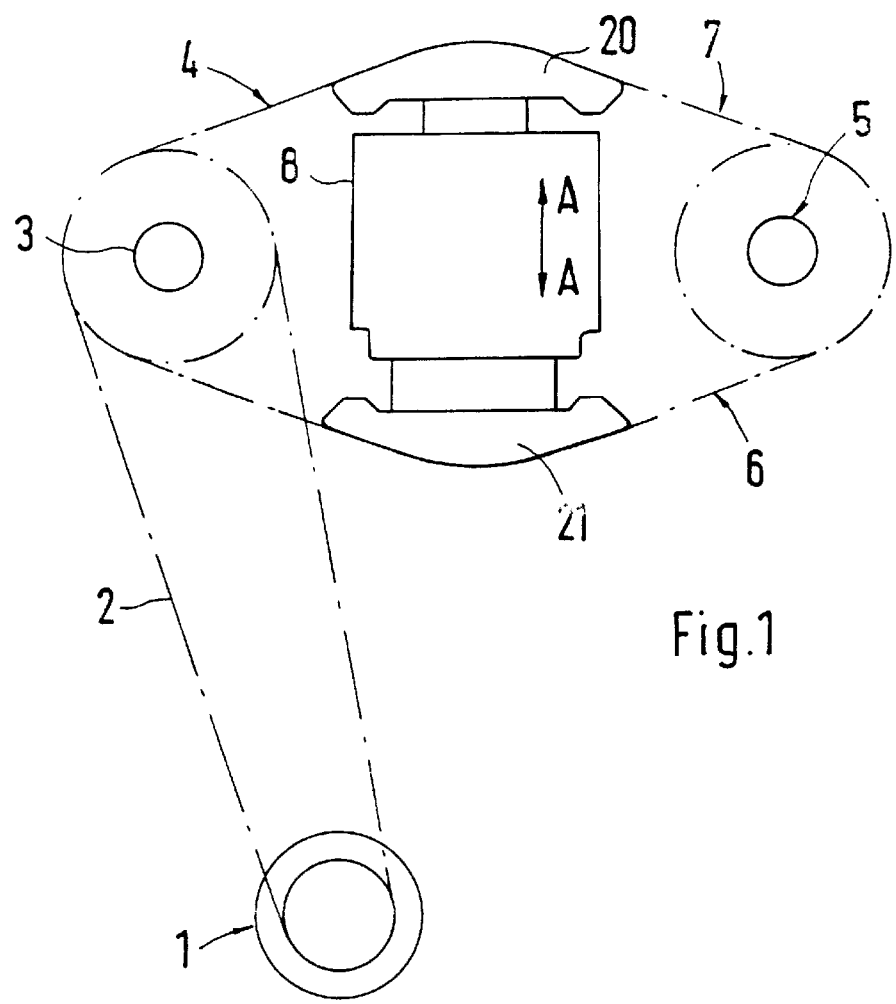
FIG. 1 is a schematic diagram of a device for adjusting the relative rotational positions of the camshafts of an engine, constructed according to preferred embodiments of the present invention.
Figure 3:
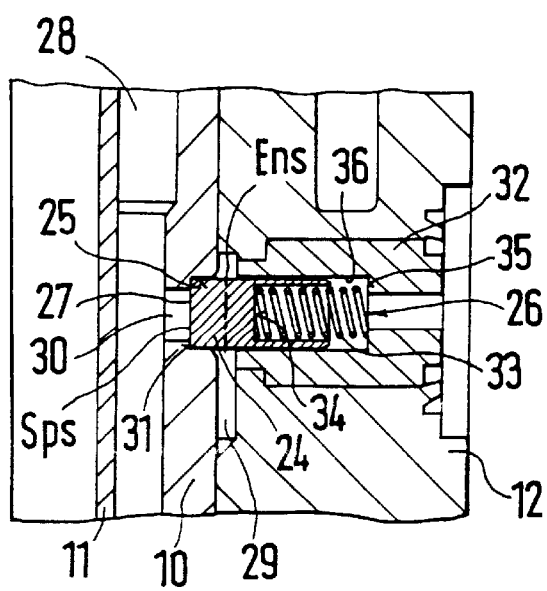
FIG. 3 is a detail X of FIG. 2 on an enlarged scale.
Figure 2:
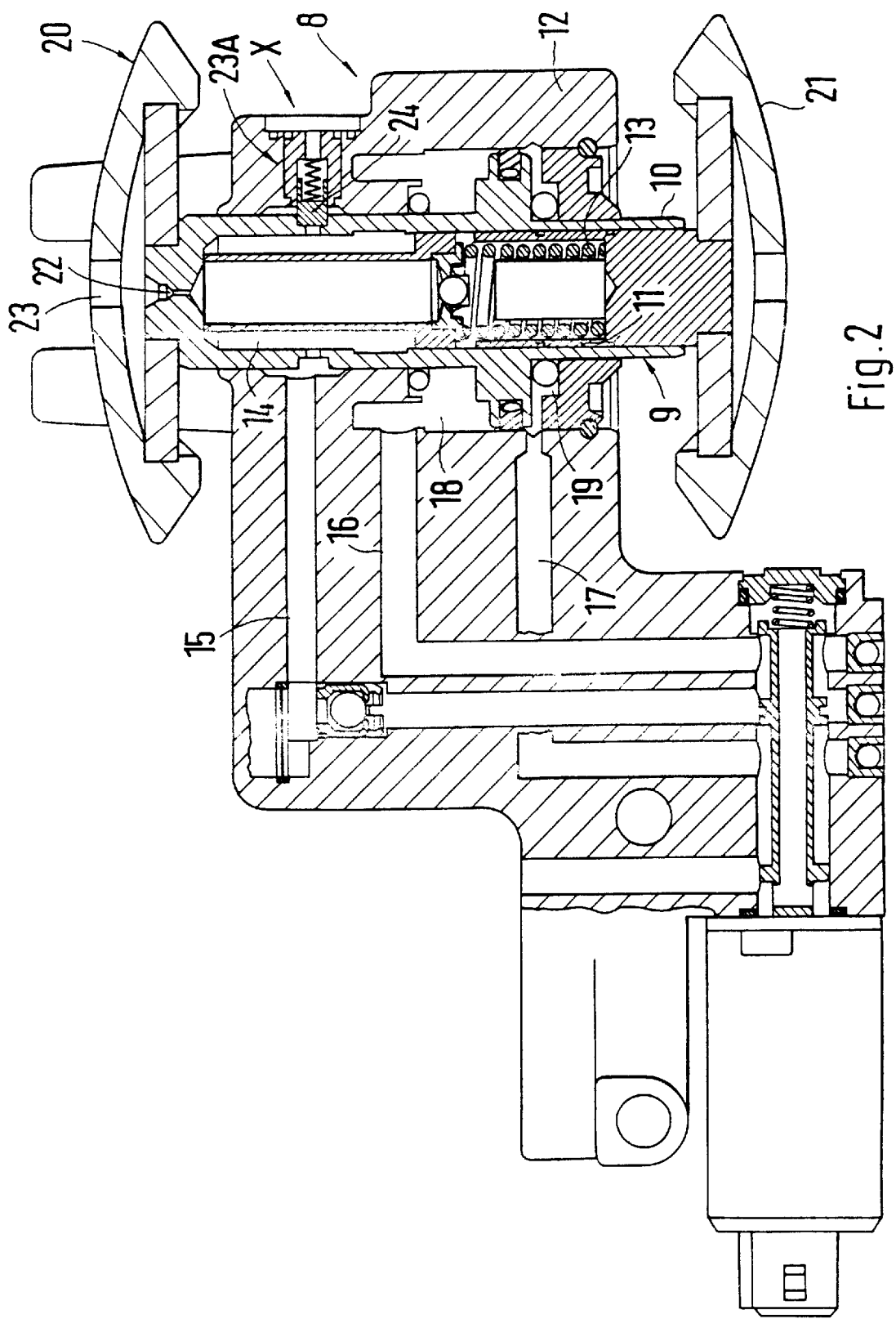
FIG. 2 is a sectional view through the device in FIG. 1.

A first camshaft 3, the exhaust camshaft, that operates the exhaust valves is powered through a chain drive 2 by a crankshaft 1 of an internal combustion engine not shown in greater detail. The first camshaft 3, by means of a chain drive including a chain 4, drives a second camshaft 5, the intake camshaft, that operates the intake valves. A device 8 is provided between a tight side 6 and slack side 7 of chain 4 for adjusting the relative rotational positions of the two camshafts 3 and 5 with respect to one another.

Device 8 includes a tensioning device 9 that consists of an outer hydraulic piston 10 and an internal hydraulic piston 11 that is guided lengthwise in piston 10 and is likewise hollow. Both pistons are accommodated in a housing 12, with a coiled compression spring 13 located between the above pistons. Tensioning device 9 is displaced transversely, in direction A—A, to chain 4 for adjusting the relative rotational position of the second camshaft 3, so that the slack side 7 of chain 4 is lengthened and the tight side 6 is shortened, or the slack side 7 is shortened and the tight side 6 is lengthened.

Inner hydraulic piston 11 is connected to a pressure chamber 14 and to a first pressure line 15 while the outer hydraulic piston 10 is connected to a second pressure line 16 and a third pressure line 17 connected with pressure chambers 18, 19. The outer hydraulic piston 10 can be pressurized alternately with hydraulic medium by pressure chambers 18 and 19.

In addition, hydraulic pistons 10, 11 are provided at their ends with tracks 20, 21 made of plastic, over which chain 4 runs.

An injection bore 22 is provided on the top of outer hydraulic piston 10, from which bore hydraulic medium escapes. This hydraulic medium passes through an opening 23 in tracks 20 and acts as a lubricant between the sliding surface of track 20 and chain 4. In addition, it escapes readily through injection bore 22 as the pressure of the hydraulic medium that develops during the starting process increases.

Device 8 cooperates with a locking device 23A that secures the adjusting mechanism, formed by the outer hydraulic piston 10, positionwise before starting or up to a point shortly after the engine starts. Locking device 23A locks the outer hydraulic piston 10 and is operated hydraulically. For this purpose, a locking piston 24 is provided that extends in the radial direction with respect to the outer hydraulic piston 10 and cooperates with a cylindrical recess 25 in piston 10. Locking piston 24 can be pressurized on one side by hydraulic medium from tensioning device 9 and is secured on the other side in a locking position Sps by means of a spring element 26. A free side 27 of locking piston 24 is connected with a first hydraulic chamber 28 provided between inner hydraulic piston 10 and outer hydraulic piston 11. In addition, the free side 27 of locking piston 24 is surrounded between outer hydraulic piston 10 and housing 12 by a second hydraulic chamber 29. The two hydraulic chambers 28 and 29 are connected with each other by an opening 30. Opening 30 is provided in a wall section 31 that delimits recess 25 and serves as a stop for locking piston 24 in locking position Sps.

Locking piston 24 is accommodated in a bearing part 32 inserted into housing 12. This bearing part 32 also accepts spring element 26 that attempts to move piston 24 out of an unlocking position Ens into a locking position Sps. This spring element 26 is a compression spring 33 which on one side abuts a wall of the bore 34 of the locking piston and on the other side abuts a stop 35 of bearing part 32. Stop 35 delimits a bore 36 for locking piston 24.

Before the engine starts, locking piston 24 assumes the locking position Sps. The outer hydraulic piston 10 is fixed positionwise. When the engine starts, hydraulic chamber 28 is filled and hydraulic pressure builds that influences the free side 27 of locking piston 24 and, after approximately three seconds, moves into unlocking position Ens against the action of compression spring 33. In this unlocking position Ens, adjusting movements of outer hydraulic piston 10 are possible for adjusting the relative rotational positions of camshafts 3 and 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Device for tensioning and adjusting the relative rotational positions of camshafts with respect to one another that are rotatably mounted in an engine for actuating valves, wherein said device cooperates with a locking device that secures the positioning mechanism of a hydraulic piston of the device before starting or up to a point shortly after the starting of the engine, wherein the device for tensioning and adjusting is designed as a chain drive comprising a chain by which one camshaft of the engine drives a second camshaft, so that by adjusting the chain using a tensioning device that operates transversely to the chain, the relative rotational positions of the camshafts with respect to one another are changed, said tensioning device being displaced transversely to the chain for adjusting said chain, in such fashion that the slack side of the chain is lengthened and the tight side is shortened or the slack side is shortened and the tight side is lengthened, with this tensioning device being operated hydraulically and comprising a hollow outer hydraulic piston, a likewise hollow inner hydraulic piston guided lengthwise therein, and a coiled compression spring tensioned in the cavity between the two hydraulic pistons, wherein the locking device cooperates with the outer hydraulic piston and can be operated hydraulically and mechanically, and wherein the locking device comprises a locking piston that is located radially with respect to the outer hydraulic piston and cooperates with a recess designed as a receptacle in the outer hydraulic piston.

2. Device according to claim 1, wherein the locking piston is located in a bearing part inserted into a housing for the hydraulic pistons.

3. Device according to claim 2, wherein the spring element is configured to move the locking piston from an unlocking position into a locking position and is a compression spring that is abutted on one side by a wall of the bore of the locking piston and on the other side by a stop of a bearing part.

4. Device according to claim 1, wherein the locking piston is exposed on one side to the hydraulic medium in the tensioning device and is held on the other side in a locking position by a spring element.

5. Device according to claim 4, wherein the locking piston is located in a bearing part inserted into the housing for the hydraulic pistons.

6. Device according to claim 4, wherein the free side of the locking piston is exposed to hydraulic medium from a first hydraulic chamber between the outer hydraulic piston and the inner hydraulic piston.

7. Device according to claim 6, wherein a free side of the locking piston is surrounded by a second hydraulic chamber, which is connected with the first hydraulic chamber by an opening.

8. Device according to claim 7, wherein the opening is provided in a wall section of outer hydraulic piston that delimits the recess.

9. Device according to claim 1, wherein the free side of the locking piston is exposed to hydraulic medium from a first hydraulic chamber between the outer hydraulic piston and the inner hydraulic piston.

10. Device according to claim 9, wherein the locking piston is located in a bearing part inserted into the housing for the hydraulic pistons.

11. Device according to claim 9, wherein a free side of the locking piston is surrounded by a second hydraulic chamber, which is connected with the first hydraulic chamber by an opening.

12. Device according to claim 11, wherein the opening is provided in a wall section of outer hydraulic piston that delimits the recess.

13. Device according to claim 12, wherein the locking piston is located in a bearing part inserted into the housing for the hydraulic pistons.

14. A camshaft adjusting mechanism for adjusting relative rotational positions of first and second engine valve control camshafts, comprising:

a movable hydraulic adjusting piston operable to change the relative rotation position of the first and second camshafts as a function of the adjusting position of the adjusting piston, a locking member operable to selectively lock the adjusting position against adjusting movement, and a locking control system operable to control the locking member as a function of engine operating conditions such that the locking member locks the adjusting piston against adjusting movement before engine startup and for a predetermined period of time after engine startup, wherein said locking member is a locking piston member engageable radially in a recess of the adjusting piston, and wherein said locking control system is a locking spring biasing the locking piston member toward a locking position.

15. A camshaft adjusting mechanism according to claim 14, wherein said predetermined time is no more than 3 seconds.

16. A camshaft adjusting mechanism according to claim 14, wherein said locking control piston includes means for supplying hydraulic fluid to act on the locking piston in a direction opposite the force of the locking spring.

17. A camshaft adjusting mechanism according to claim 16, wherein said hydraulic fluid is supplied from a hydraulic fluid system which controls movement of the adjusting piston.

* * * * *

UNITED STATES PATENT AND TRADEMARK OFFICE
CERTIFICATE OF CORRECTION

PATENT NO. : 6,205,965 B1
DATED : March 27, 2001
INVENTOR(S) : Stephan et al.

Page 1 of 1

It is certified that error appears in the above-identified patent and that said Letters Patent is hereby corrected as shown below:

<u>Title page, item [73],</u>
Please change the Assignee data from "h.c.F. Porsche AG, Weissach (DE)" to -- Dr. Ing. h.c.F. Porsche AG, Weissach (DE) --.

Signed and Sealed this

Second Day of October, 2001

Attest:

NICHOLAS P. GODICI
*Attesting Officer*      *Acting Director of the United States Patent and Trademark Office*